United States Patent [19]

Johnson et al.

[11] Patent Number: 4,648,062
[45] Date of Patent: Mar. 3, 1987

[54] METHOD FOR PROVIDING AN ON LINE HELP FACILITY FOR INTERACTIVE INFORMATION HANDLING SYSTEMS

[75] Inventors: Steven E. Johnson; John Karat; Thomas M. Ruiz, all of Austin, Tex.

[73] Assignee: International Business Machines Corporation, Armonk, N.Y.

[21] Appl. No.: 697,106

[22] Filed: Feb. 1, 1985

[51] Int. Cl.$^4$ ............................................. G06F 3/00
[52] U.S. Cl. .................................................. 364/900
[58] Field of Search ........................ 364/900 MS File

[56] References Cited

U.S. PATENT DOCUMENTS 4,454,592  6/1984  Cason et al. ....................... 364/900
4,556,954 12/1985  Advani et al. ..................... 364/900
4,559,614 12/1985  Peek et al. ......................... 364/900

Primary Examiner—Raulfe B. Zache
Attorney, Agent, or Firm—Richard E. Cummins

[57] ABSTRACT

A method to help and displace Help Panels containing information to explain Command Functions, Command Syntax, and Command Parameters to the operator of an interactive information handling system in response to the entry of a "Command Help Request" into said system by said operator. The method displays the selected panel as an overlay on the existing screen at the time the Command Help request is entered into the system. Selection of the panel to be displayed is based on an analysis by the system as to what commands are valid or active for the next step in the process or task that the system is performing. The operator may select directly from the Command Help Panel overlay, the desired command, or alternately enter the command desired by moving the cursor to the command area of the underlying screen and keying in the command.

The method further provides for the system to display a second level of Command Help Panels containing information as to the Parameters and their meaning for commands selected from the first level of the Command Help Panels.

The method also advises the operator with other overlaid Help Panels if an invalid command is entered when the system is displaying a first level of Help Panel. The panels that re displayed in addition to advising that the command is not active also advise the operator how to reach the point in the process where the non-active command becomes active from the current state of the process task.

11 Claims, 5 Drawing Figures

```
┌─────────────────────────────────────────────────────┐
│            HELP ON COMMAND: PRINT                   │
└─────────────────────────────────────────────────────┘

SELECT ONE ITEM FROM EACH GROUP.

TYPESTYLE      PRESTIGE ELITE    (12 PITCH)
                    COURIER           (10 PITCH)
                    ESSAY STANDARD    (PROPORTIONAL)
                    ESSAY BOLD        (PROPORTIONAL)

DUPLEX         YES
                    NO

END WILL ELIMINATE THIS HELP WINDOW.

┌────────┬─────────┬────────┐
 │  HELP  │  ENTER  │  END   │
 └────────┴─────────┴────────┘
```

```
┌─────────────────────────────────────────────────────────┐
│              HELP ON COMMANDS FOR:                      │
├─────────────────────────────────────────────────────────┤
│                                                         │
│ SELECT ON COMMAND AND : ENTER TO EXECUTE THE COMMAND, OR│
│                  HELP TO SEE ITS PARAMETERS.            │
│                                                         │
│    PRINT      FOR PRINTING THE FILE                     │
│                                                         │
│    COPY       TO DUPLICATE THE FILE                     │
│                                                         │
│ END WILL ELIMINATE THIS HELP WINDOW.                    │
│                                                         │
├────────┬────────┬────────┬───────────────────────────────┤
│  HELP  │ ENTER  │  END   │                              │
└────────┴────────┴────────┴───────────────────────────────┘
```

FIG. 2

```
┌─────────────────────────────────────────────────────────┐
│              HELP ON COMMAND: PRINT                     │
├─────────────────────────────────────────────────────────┤
│                                                         │
│ SELECT ONE ITEM FROM EACH GROUP.                        │
│                                                         │
│    TYPESTYLE      PRESTIGE ELITE     (12 PITCH)         │
│                   COURIER            (10 PITCH)         │
│                   ESSAY STANDARD     (PROPORTIONAL)     │
│                   ESSAY BOLD         (PROPORTIONAL)     │
│                                                         │
│    DUPLEX         YES                                   │
│                   NO                                    │
│                                                         │
│ END WILL ELIMINATE THIS HELP WINDOW.                    │
│                                                         │
├────────┬────────┬────────┬───────────────────────────────┤
│  HELP  │ ENTER  │  END   │                              │
└────────┴────────┴────────┴───────────────────────────────┘
```

FIG. 3

METHOD FOR PROVIDING AN ON LINE HELP FACILITY FOR INTERACTIVE INFORMATION HANDLING SYSTEMS

DESCRIPTION

Technical Field

This invention relates in general to interactive information handling systems and, in particular, to an improved method for providing on line assistance for the operators of such systems.

BACKGROUND

The term "interactive information handling system" (IIHS) refers to an information handling system in which the system is highly dependent upon interaction with the operator of the system. The nature of the interaction generally involves either the system displaying to the operator on a display device such as a video terminal certain information, and the operator responding by entering information into the system via an input device (e.g., keyboard, mouse, tablet, voice, etc.). The interaction may also reflect that the operator has entered information into the system and the system responds to that information by displaying something to the operator.

The degree of interaction between the operator and the system varies, depending upon the system configuration, application being run by the particular program, and the task that the operator has chosen to execute.

A large number of data processing systems currently exist which perform on an interactive basis. A very large percentage of personal computers currently are involved in processing applications that are highly interactive. Examples of such applications are the various text processing programs and spreadsheet type programs that are available to operators of the various personal computers.

The commercial success of an application program probably is more dependent upon how "user friendly" that program appears to the operator, than how fast or how efficient that program actually is. Most application programs of any complexity therefore provide some sort of on line command help facility which the operator can call upon for assistance. This is a necessity to a large extent because of the rate at which personal computers are being employed for both business and personal use. The average operator has had little or no formal training in computers, and has acquired the present state of knowledge primarily by doing specific tasks with each new program.

As application programs incorporate more and more functions, they become more complex and involve more commands with various parameters. The operator is therefore required to remember more and more procedures involving, for example, specific keystroke sequences, data input syntax, and command semantics. As often happens, some functions of the application are done infrequently so there is a tendency on the part of the operator to forget varying aspects of command procedures.

Many application programs provide an on line Command Help Facility that is basically a condensed version of the operating guide. This type of Help Facility is generally used in a manner that corresponds to what the operator does with the operating guide except that it is automated.

While this type of Help Facility may provide some assistance to the new operator as a basic learning tool, it is not very efficient for the average operator who is faced with a specific problem and is seeking a specific answer for that problem. Such Command Help Facilities assume that the operator has enough knowledge and vocabulary to select, from a displayed index, the specific section of the manual that will solve the problem. For example, when the operator initiates the Help Command, a list of all the commands relating to the application are presented. The operator must determine which command to select, even though some commands may not be accessible under the current context. After the operator has guessed which command may be appropriate he is presented with a complete functional description of the command. After reading this information, the operator must terminate the help to return to the application. The operator must then input that command based on the information that was read in the Help Facility. The problems associated with this type of help are as follows. The operator is removed from the current context of the application being performed and is forced to remember the Help information when returning to the active dialogue. Furthermore, while reviewing the Help information, the operator cannot perform the command, but is required to terminate the Help function before returning to the application. Also, the operator may receive more information than is really needed. Direct assistance on a function is usually required than a lengthy description of the function.

Further, the operator may not know which function needs to be performed at the time. The operator is presented with all possible options, while in fact, many of the commands may not be accessible at that point in his task process.

In contrast to current state of the art Help Facilities, Contextual Help for commands provides three levels of support to the operator. The first level allows the operator to request currently valid commands. The second level allows the operator to request help on the parameters for a command. These first two levels are active participants in helping the operator complete the entry of Commands and their Parameters. The third level is for commands and/or Parameters that are not valid within the current step of the task process, but are valid within the task or the activity that is being performed by the operator.

SUMMARY OF THE INVENTION

The present invention provides a method for displaying Help information to the operator in three different levels which are selectable by the operator. In accordance with the present invention, a method of displaying Help information to the operator of an interactive information handling system is provided in which the type of information that is displayed is closely related to the specific step in the task process that the operator is currently involved with at the time the help request is initiated. In addition, the method permits commands to be entered while the Help Panel is being displayed so the operator does not have to remember detailed sequences to execute when returned to the previous screen. In one embodiment the operator merely has to copy the appropriate Command data from the Help Panel into the normal Command area of the screen and request Enter. In another embodiment the Command data can also be selected or entered on the panel Help itself. The system responds and executes the entered command as if the original screen was displayed.

It is therefore an object of the present invention to provide an improved Command Help Facility for an interactive information handling system. Another object of the present invention is to provide an improved Help Facility, or an interactive information handling system in which the Help information that is displayed to the operator is in context relative to the specific step of the task that is being processed at the time the Help request is entered by the operator.

A further object of the present invention is to provide a Command Help Facility for an interactive information handling system which permits the entry of a command into the system by the operator while the Help screen explains an aspect of the command that is being displayed to the operator.

Objects and advantages other than those mentioned above will become apparent in the following description when read in connection with the drawing.

DESCRIPTION OF DRAWING

FIG. 2 is an example of an active Help Panel displayed to the operator by the system of FIG. 1 during the Command entry portion of the present invention.

FIG. 3 is an active Help Panel displayed to the operator of the system 1 during entry of Parameters for a print command.

DETAILED DESCRIPTION

Figure 1:
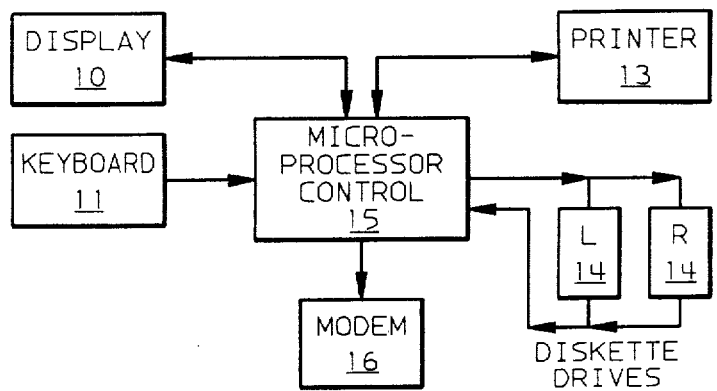
FIG. 1 is a block diagram of an interactive information handling system in which the method of the present invention may be advantageously employed.

FIG. 1 is a block diagram of a state of the art interactive information handling system. The system, as shown, comprises a display device 10 which can be a conventional video terminal for displaying information to the operator; a keyboard 11 which the operator uses to enter information including commands and data into the system; a printer 13 which functions to provide hard copy output of information selected by the operator; a pair of diskette drives 14L and 14R which function to transfer information between the system and the magnetic storage diskettes that are removably associated with the diskette drives and which store both programming information and text information. System components 10, 11, 13, 14L, and 14R are connected as shown in FIG. 1 to the microprocessor block 15 which functions as the overall control for the system and interrelates the various system components to perform their specific function at the appropriate time. The system of FIG. 1 may also include a modem 16 which functions to interconnect the system with other systems through various communication links.

It will be assumed, for purposes of explanation, that the system shown in FIG. 1 is a general purpose programmable system such as the IBM Personal Computer and the components shown in FIG. 1 function in the same manner as the normal conventional components associated with the Personal Computer.

While the system shown employs two diskette drives, it will be appreciated by those persons skilled in the art that one of those drives could be replaced with a so-called "hard disk storage subsystem" without effecting the overall functions relating the various blocks or the general operation of the system.

In order to operate the system of FIG. 1 the operator inserts a Disk Operating System (DOS) diskette into diskette drive 14L and turns on the system unit 15. The microprocessor in the system unit 15 causes the initial program load function to be performed which involves a number of tests on the processor hardware and the installation of the DOS programming into memory. DOS then takes over and controls the system's response to commands entered into the system by the operator and/or commands entered into the system by an application program that is stored on the fixed disk subsystem. Another program diskette which the operator inserts into drive 14L in place of the DOS diskette may also be run. It will be assumed, for purposes of explanation, that the application program is a text processing program. However, it should be understood that the system of Fig.1 is capable of running other type applications such as any of the well-known spreadsheet programs, data base programs, and even the so-called integrated programs which permit separate applications to be integrated together and to interrelate to each other.

The details of the text processing program are not important to an understanding of the present invention, except that in operating the text processing program, an example of the situation in which the operator needs the Command Help Facility must be established to assist in an understanding of the manner in which assistance is requested and provided in accordance with the present invention. The situation which exists at the time the operator requires assistance through the Command Help Facility is that a document has been created in the system by the operator interacting with various functions of the text processing program and the next major function is to print the document. It is assumed that in this process the operator has executed the appropriate keystrokes on the keyboard to advise the system that the document creation function is completed so that future keystrokes will therefore not be incorporated into the document as text. The details by which the ending operation is achieved varies with different text processing programs. However, since these details are not significant to an understanding of the present invention, they are not described.

The possibility of an operator needing assistance to merely print a document with the standard defaults that have been previously established is probably very remote. A more realistic assumption is that the operator wants to print the document in a format and text style that is not the default setting and that the text processing program is provided with the ability to either change the defaults or, more likely, to merely override the defaults for this particular document.

The operator, at that point, relies on the on line Command Help Facility for assistance in overriding the formatting and type style defaults.

Figure 4A:
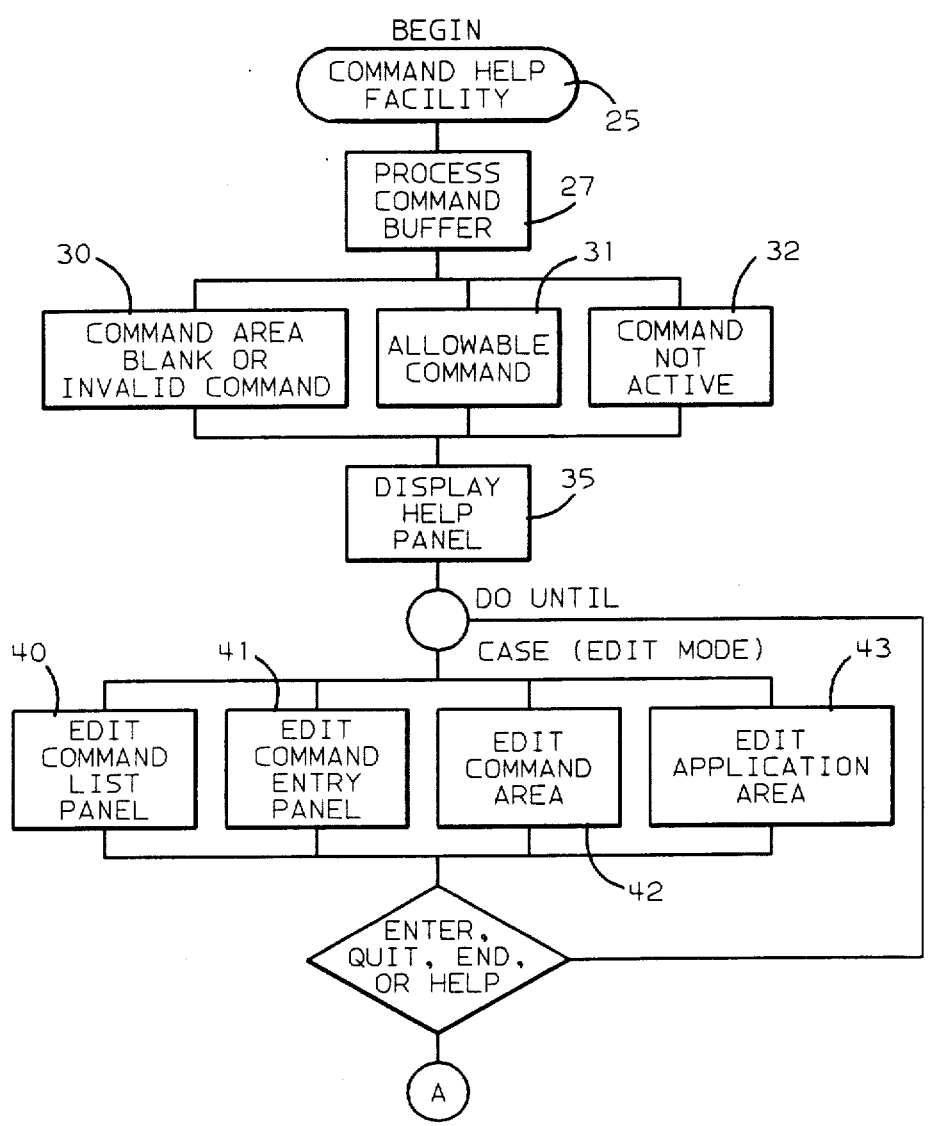
FIGS. 4A and 4B are a flow chart which sets forth sequences of steps involved in the method of the present invention.
Figure 4B:
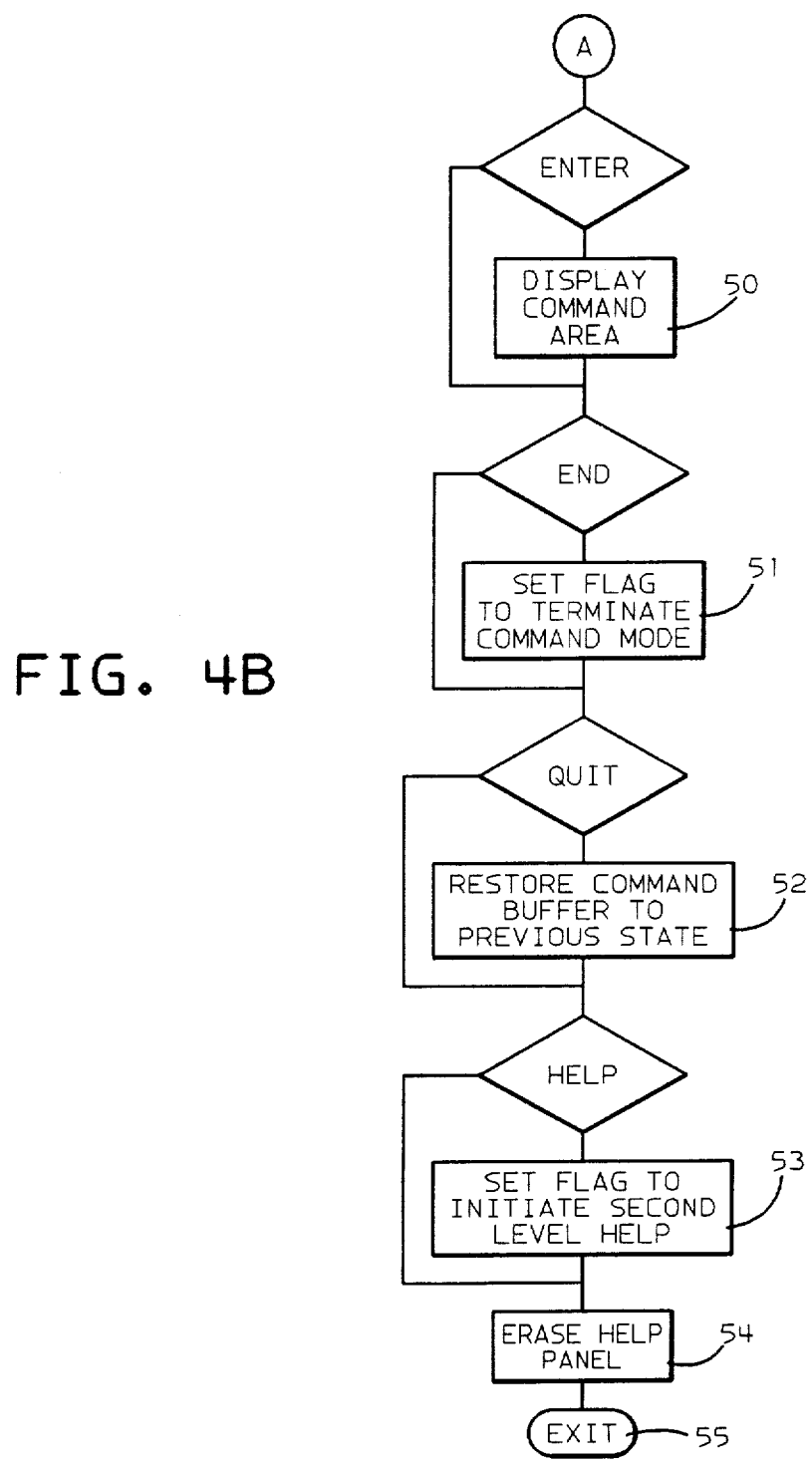

FIG. 4 is a flow chart which sets forth the general organization of the Help Facility process which is also shown in greater detail in Table 1 at the end of the specification.

The Command Help Facility, as shown in FIG. 4, is entered in response to the operator's request for help. For example, after the system receives the information that the document creation process is ended, the cursor is automatically positioned to the Command area of the screen by the system in preparation for the next command. With the cursor in the Command area, the operator presses the Help key or takes whatever action the system has established. In some systems the Help icon is displayed which then must be "cursor selected." This is one example of an implementation. In other systems a key combination of the Control key and some other key is used to advise the system that the Help Facility is being requested.

The request for the Command Facility results in an analysis of the state of the text processing task by blocks 27-32 in FIG. 4. The basic fundamental assumption of the improved contextual Help Facility is that the operator is only interested in actions that logically follow or are allowable at this point in the text processing process. The analysis therefore proceeds on that assumption to select a Help Panel which displays only the allowable commands. Under the assumed condition, a Help Panel such as shown in FIG. 2 is displayed since the analysis involved block 30. The panel displays two allowable commands with a short explanation of each command function. Instructional information is also provided at the top of the panel, advising the operator to "Select one command," and press Enter to execute the correct command or request Help to see the Parameters that are associated with that command. Selection of the command in this example is by positioning the selection cursor to the line containing the desired command or some equivalent function, depending on the system.

The panel also advises the operator that selecting END will eliminate the Help Panel from the screen and return the system to the point it was at previous to the Help request.

Under the previous assumption, the operator required assistance for the Command Parameters and therefore advises the system of the need for additional help by selecting the Help icon (or taking an equivalent action in other systems). As indicated in the flow chart at block 53, the Help Panel shown in FIG. 3 is displayed since block 53 causes an exit at port 55 and re-entry at block 25. Block 31 validates the Help request as valid and displays the second level Help Panel. This provides a mechanism for the operator to select a particular type style and indicate whether the document should be duplexed (printed on both sides) or not. The process of selection is again by positioning the selection cursor on the line containing the desired item, which then becomes highlighted. The FIG. 3 panel contains similar directional information for the operator and represents the second level of the Command Help Facility.

It should be understood that FIGS. 2 and 3 in the preferred embodiment are Help Windows and not Help Screens; the term "Window" signifying that the panel that is displayed at the time the Help Facility is requested remains displayed and the Help Panel is an overlay. The position of the Help Panel overlay or window on the screen is relative to the location of the Command area where command(s) are being entered. It should be further understood that the user is allowed to "switch" from the interactive Command Help Panel to the Command area and input the command directly while viewing the Command Help information. The Help Panel is removed from the screen by block 54 and the cursor positioned in the Command area when the command that was selected from the Command Help Panel has executed (as determined by the task dependent on the situation).

When the operator enters a command or parameter that does not apply within the current context of the processed dialogue (but does apply within the task or activity for which the Command Help was performed) and requests the Help action, an Information Panel is presented, stating that:

(a) the Command and Parameter is not valid within the current dialogue
(b) the use or uses of the Command and/or the Parameter
(c) the state or states in which the Command and/or the Parameter are valid
(d) how to reach the proper state for using the Command or the Parameter The Help information that is presented is the same information that is presented if the operator requested a Command and/or Parameter that was not valid in the current state and had requested Help on the message to that effect that was displayed.

While the Command Help Panel is displayed, the operator is able to terminate the Command Help session by requesting the END or QUIT actions 51 and 52 from within the Command Help Panel. This returns the cursor to the Command area, restoring the state prior to execution of the Help Command.

The method of providing contextual active help for commands and the Command Parameters provides the following benefits to the operator. It allows the operator to perform a Command directly from the Help Facility without entering and exiting a specialized Help Panel presented outside the context of the text processing dialogue. Since only commands that are active within the current processed dialogue are presented, the operator does not have to guess which are and are not active, thus providing less confusion. The method does not require the operator to memorize complex Command/Parameter syntax and semantics.

The following programming pseudocode lists in the left hand column of Table 1, are a series of programming statements that are of interest and assistance to those persons skilled in the art of programming interactive information handling systems in implementing the method of the present invention and understanding how the invention has been implemented in the preferred embodiment. The right hand column of Table 1 lists text comments which reflect the function or action occurring in the system at that step in the process. The code sections follow generally the flow chart of FIG. 4, with the reference characters applied to the blocks in FIG. 4 also being used for the corresponding code statements in Table 1.

TABLE 1

| PESUDOCODE | COMMENT |
|---|---|
| BEGIN (COMMAND HELP FACILITY) | 25 DATA CURSOR IN THE COMMAND AREA WHEN 'HELP' ACTION SELECTED |
| . READ COMMAND AREA BUFFER | |
| . SAVE COMMAND AREA BUFFER IN TEMPORARY BUFFER | |
| . CALL 'PROCESS COMMAND BUFFER' | |
| . CASE OF COMMAND VALIDATION | |
| . . CASE: 'COMMAND AREA BLANK OR INVALID COMMAND' | |

TABLE 1-continued

| PESUDOCODE | COMMENT |
|---|---|
| ... IF INVALID COMMAND | COMMAND NOT ALLOWED WITHIN THE APPLICATION |
| ... THEN | |
| .... WRITE MESSAGE AREA BUFFER | POST "INVALID COMMAND" MESSAGE |
| .... CALL 'PREPARE MESSAGE AREA' | POP-UP OR FIXED MESSAGE AREA |
| .... DISPLAY MESSAGE AREA | |
| ... ENDIF | |
| ... CALL 'SELECT LIST OF ALLOWABLE COMMANDS' | ONLY COMMANDS THAT CAN BE PROCESSED FOR CURRENT APPLICATION STATE |
| ... CALL 'FORMAT COMMAND LIST MENU' | |
| ... CALL 'PREPARE HELP AREA' | POP-UP WINDOW OR OVERLAY AT A FIXED LOCATION ON THE SCREEN |
| ... COPY COMMAND LIST HELP MENU INTO HELP AREA | |
| .. CASE: 'ALLOWABLE COMMAND' | 31 USER HAS KEYED VALID COMMAND NAME AND SOME PARAMETERS |
| ... READ DEFAULT PARAMETERS FOR SELECTED COMMAND | |
| ... COPY PARAMETERS KEYED IN COMMAND AREA BUFFER | OVERRIDE DEFAULTS |
| ... CALL 'FORMAT COMMAND ENTRY PANEL' | |
| ... CALL 'PREPARE HELP AREA' | POP-UP WINDOW OR OVERLAY AT A FIXED LOCATION ON THE SCREEN |
| ... COPY COMMAND ENTRY HELP PANEL INTO HELP AREA | |
| .. CASE: 'COMMAND NOT ACTIVE' | 32 COMMAND ALLOWED IN APPLICATION BUT CANNOT BE PROCESSED FOR CURRENT APPLICATION STATE |
| ... READ HELP INFORMATION FOR SELECTED COMMAND | |
| ... CALL 'FORMAT HELP INFORMATION PANEL' | |
| ... CALL 'PREPARE HELP AREA' | POP-UP WINDOW OR OVERLAY AT A FIXED LOCATION ON THE SCREEN ... COPY HELP |
| INFORMATION PANEL INTO HELP AREA | |
| . ENDCASE | |
| DISPLAY HELP AREA | 35 |
| DO UNTIL 'ENTER', 'END', 'QUIT' OR 'HELP' ACTION SELECTED | |
| . CASE OF EDIT MODE | USER IS ALLOWED TO EDIT ANY WINDOW VISIBLE ON THE SCREEN |
| .. CASE: 'COMMAND LIST HELP MENU' | 40 |
| ... EDIT COMMAND LIST MENU | USER SELECTS 1 COMMAND FROM LIST |
| ... CALL 'PROCESS MENU ITEM INTO LINEAR COMMAND FORMAT' | |
| ... WRITE COMMAND AREA BUFFER | |
| .. CASE: 'COMMAND ENTRY PANEL' | 41 |
| ... EDIT COMMAND ENTRY PANEL | USER SELECTS AND ENTERS PARAMETERS TO CREATE A COMPLETE COMMAND STRING |
| ... CALL 'PROCESS COMMAND ENTRY PANEL INTO LINEAR COMMAND FORMAT' | |
| ... WRITE COMMAND AREA BUFFER | |
| .. CASE: 'COMMAND AREA' | 42 |
| ... EDIT COMMAND AREA | USER CAN KEY A COMMAND STRING WHILE COMMAND HELP IS ACTIVE |
| ... CALL 'PROCESS COMMAND AREA DATA INTO LINEAR COMMAND FORMAT' ... WRITE COMMAND AREA BUFFER | |
| .. CASE: 'APPLICATION AREA SELECTED' | 43 |
| | USER CAN EDIT INFORMATION WITHIN THE APPLICATION AREA WHILE HELP IS ACTIVE |
| ... RETURN CONTROL TO APPLICATION EDITING ROUTINES | |
| . ENDCASE | |
| ENDDO | |
| IF 'ENTER' ACTION SELECTED | |

TABLE 1-continued

| PESUDOCODE | COMMENT |
|---|---|
| THEN | |
| . DISPLAY COMMAND AREA | 50 |
| ENDIF | |
| IF 'END' ACTION SELECTED | |
| THEN | |
| . SET FLAG TO TERMINATE COMMAND MODE | 51 |
| ENDIF | |
| IF 'QUIT' ACTION SELECTED | RETURN TO PREVIOUS STATE BEFORE HELP SELECTED |
| THEN | |
| . COPY TEMPORARY COMMAND AREA BUFFER TO COMMAND AREA BUFFER | |
| . DISPLAY COMMAND AREA | 52 |
| ENDIF | |
| IF 'HELP' ACTION SELECTED | USER MAY SELECT FURTHER HELP WHILE COMMAND HELP IS ACTIVE |
| THEN | |
| . SET FLAG TO INITIATE SECOND LEVEL HELP | 53 |
| | HELP FACILITY WILL RE-INITIATE THE COMMAND HELP ROUTINE IF SECOND LEVEL COMMAND HELP IS REQUESTED BY USER |
| . ENDIF | |
| . CALL 'ERASE HELP PANEL' | 54 |
| EXIT (COMMAND HELP FACILITY) | 55 |

While the invention has been particularly shown and described with reference to a particular embodiment thereof, it will be understood by those skilled in the art that a various change in the form and details may be made therein without departing from the spirit and scope of the invention.

Having thus described our invention, what is claimed is new and desired to secure by letters patent is:

1. A method to assist the operator of an interactive information handling system in entering command via an input device in response to the entry by said operator of a "Command Help Request;" said method including the steps of,
   (1) determining what commands are valid as the next command based on an analysis of the current state of the process task being performed by the system at the time said request command is issued and
   (2) displaying at least one Help panel that overlays a portion of the information on the screen at the time said request is entered which contains the names of only valid commands that can be entered into the system at the current state of the process task and explains the functions of the named commands.

2. The method recited in claim 1 further including the steps of,
   (3) selecting a named command from said displayed Help Panel and,
   (4) entering said selected command into said system.

3. The method recited in claim 2 in which said step of selecting a named command includes the step of said operator positioning the "selection cursor" to the line on said Help Panel containing the name of the command.

4. The method recited in claim 3 further including the step of said operator actuating "enter" to cause entry of the command selected in the Help Panel into said system.

5. The method recited in claim 3 in which said step of selecting and entering includes the step of positioning the cursor in the Command area of the screen and the step of keying in the name of the selected command as displayed in said Help Panel and actuating said "enter" action.

6. The method recited in claim 2 further including the step of entering another Help request into said system after said command name has been selected and prior to actuating said "Enter" action.

7. The method recited in claim 6 further including the step of displaying a second Help Panel to said operator in place of said first Help Panel in response to entry into said system of said second Help request.

8. The method recited in claim 7 in which said second Help Panel contains Executable Command Parameters and explanatory information on the parameters for the commands selected on said first Help Panel.

9. The method recited in claim 8 in which said step of entering said selected command includes the step of entering the Command Parameters while said second Help Panel is displayed.

10. The method recited in claim 1 further including the step of replacing said first Display Panel with the third Help Panel in response to entering by said operator of a Command name into said system that is not displayed on said first panel.

11. The method recited in claim 10 in which said third Display Panel includes information advising the operator that said entered command is not active and valid command for the current point of the processing task and further displays information on the steps to follow to place the system at a point where the command is valid.

* * * * *